United States Patent [19]

Finn

[11] Patent Number: 5,012,407
[45] Date of Patent: Apr. 30, 1991

[54] COMPUTER SYSTEM WHICH ACCESSES OPERATING SYSTEM INFORMATION AND COMMAND HANDLERS FROM OPTICAL STORAGE VIA AN AUXILIARY PROCESSOR AND CACHE MEMORY

[76] Inventor: Charles A. Finn, 26762 SW. 124 Ct., Naranja, Fla. 33032

[21] Appl. No.: 680,477

[22] Filed: Dec. 11, 1984

[51] Int. Cl.$^5$ .................................. G06F 15/00
[52] U.S. Cl. ........................ 364/200; 364/232.5; 364/228.5; 364/237.82; 235/454
[58] Field of Search ....... 364/200 MS FILE, 900 MS FILE; 369/100; 365/122; 235/454; 346/76 L

[56] References Cited

U.S. PATENT DOCUMENTS

| | | | |
|---|---|---|---|
| 3,812,477 | 5/1974 | Wieder | 340/173 LM |
| 3,978,320 | 8/1976 | McBride, Jr. | 235/61.12 M |
| 4,001,550 | 1/1977 | Schatz | 235/61.7 B |
| 4,037,215 | 7/1977 | Birney et al. | 364/200 |
| 4,092,524 | 5/1978 | Moreno | 235/419 |
| 4,180,854 | 12/1979 | Walden et al. | 364/200 |
| 4,211,919 | 7/1980 | Ugon | 235/487 |
| 4,269,917 | 5/1981 | Drexler et al. | 430/16 |
| 4,278,756 | 7/1981 | Bouldin et al. | 430/414 |
| 4,278,758 | 7/1981 | Drexler et al. | 430/616 |
| 4,284,716 | 8/1981 | Drexler et al. | 430/510 |
| 4,298,684 | 11/1981 | Bouldin et al. | 430/616 |
| 4,298,793 | 11/1981 | Melis et al. | 235/487 |
| 4,298,932 | 11/1981 | Sams | 364/200 |
| 4,304,848 | 12/1981 | Bouldin et al. | 430/401 |
| 4,312,938 | 1/1982 | Drexler et al. | 430/496 |
| 4,314,260 | 2/1982 | Drexler | 346/76 L |
| 4,319,252 | 3/1982 | Drexler | 346/135.1 |
| 4,341,951 | 7/1982 | Benton | 235/379 |
| 4,343,879 | 8/1982 | Drexler et al. | 420/14 |
| 4,360,728 | 11/1982 | Drexler | 346/76 L |
| 4,363,870 | 12/1982 | Bouldin | 430/510 |
| 4,367,402 | 1/1983 | Giraud et al. | 235/385 |
| 4,371,928 | 2/1983 | Barlow et al. | 364/200 |
| 4,383,024 | 5/1983 | Bouldin | 430/271 |
| 4,385,372 | 5/1983 | Drexler | 369/109 |
| 4,396,701 | 8/1983 | Bouldin | 430/271 |
| 4,410,581 | 10/1983 | Nam | 428/195 |
| 4,465,901 | 8/1984 | Best | 364/200 |
| 4,473,878 | 9/1984 | Zolnowsky et al. | 364/200 |
| 4,477,852 | 10/1984 | Ota et al. | 369/100 X |
| 4,575,827 | 11/1986 | Kulakowski | 365/230.01 |
| 4,637,008 | 1/1987 | Eden | 369/100 |
| 4,665,512 | 5/1987 | Ando | 369/100 X |

OTHER PUBLICATIONS

Peter Norton "Inside the IBM PC", Robert J. Brady Co., 1983, pp. 55–64.
Patent Abstracts of Japan, vol. 11, No. 144, 61-280048.

Primary Examiner—Thomas C. Lee
Attorney, Agent, or Firm—Welsh & Katz, Ltd.

[57] ABSTRACT

An apparatus for extending the memory capacity of a computer system having discrete memory storage. The apparatus including a scanner for accessing computer information, and a memory device for storing computer information and for accessing and transferring computer information to and from the scanner and to and from the discrete memory storage of the computer system. The scanner utilizing an optical laser scanning system to encode computer information on a physical medium. The memory device utilizing virtual memory techniques to store and retrieve data for use at a required time.

6 Claims, 4 Drawing Sheets

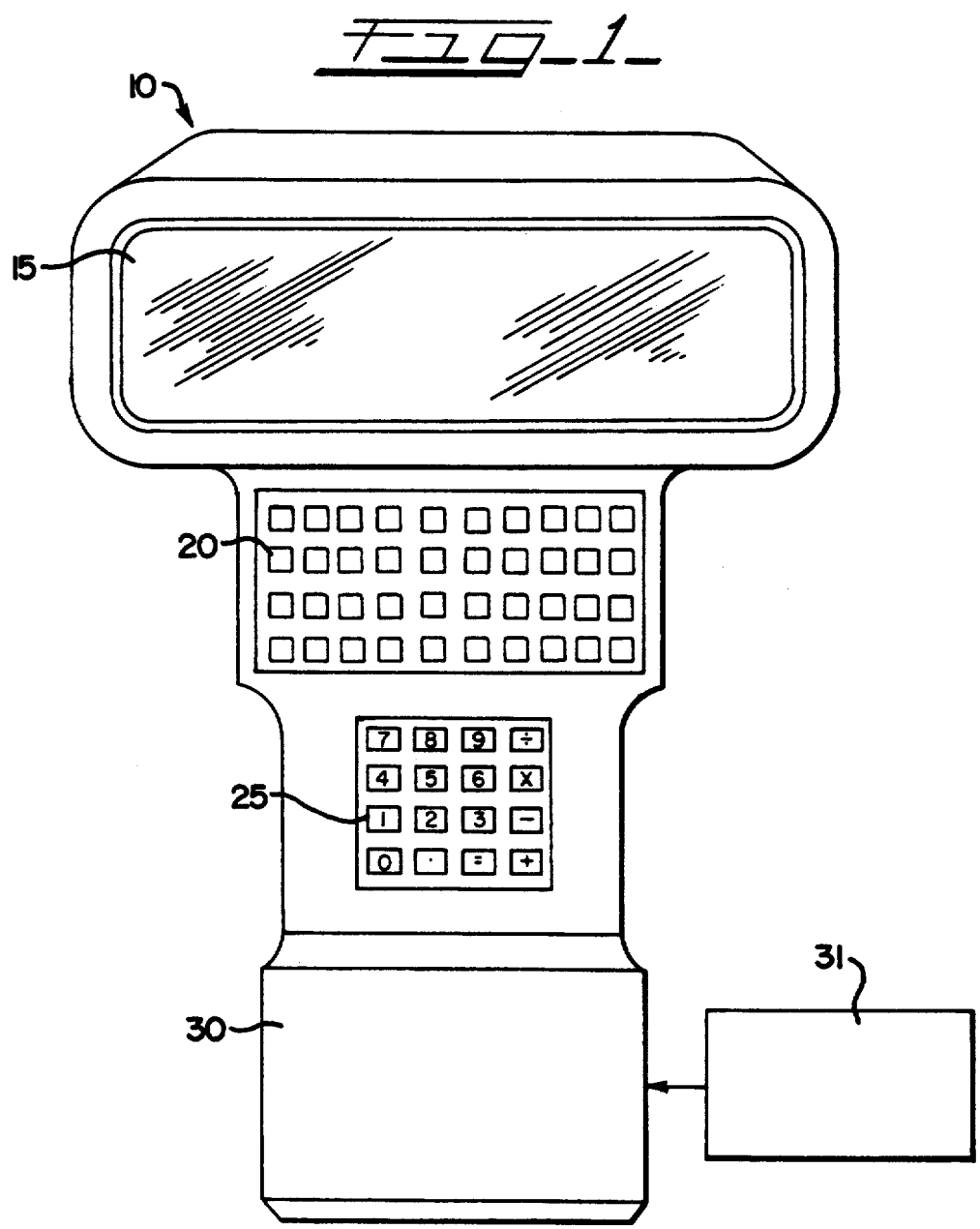

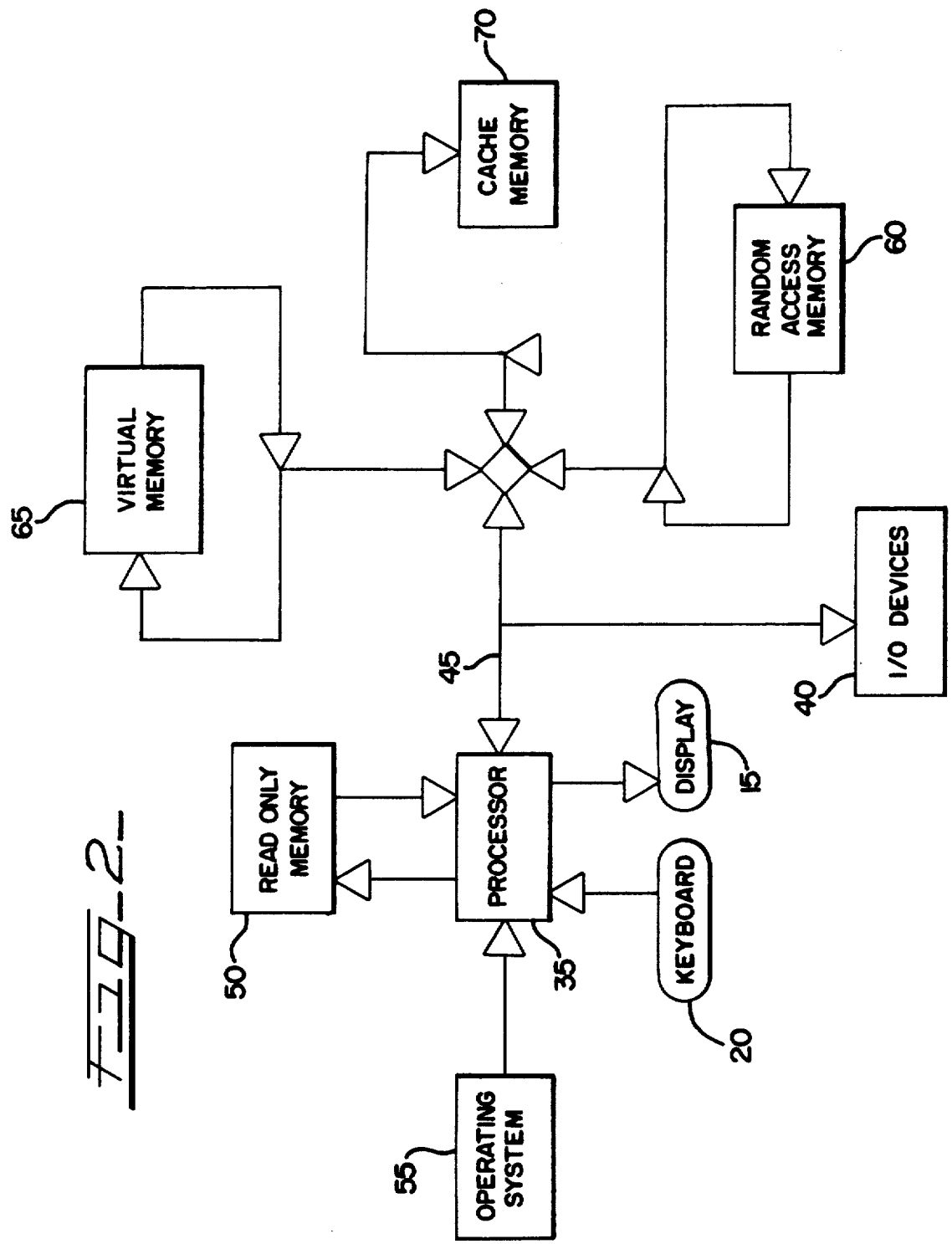
FIG_2

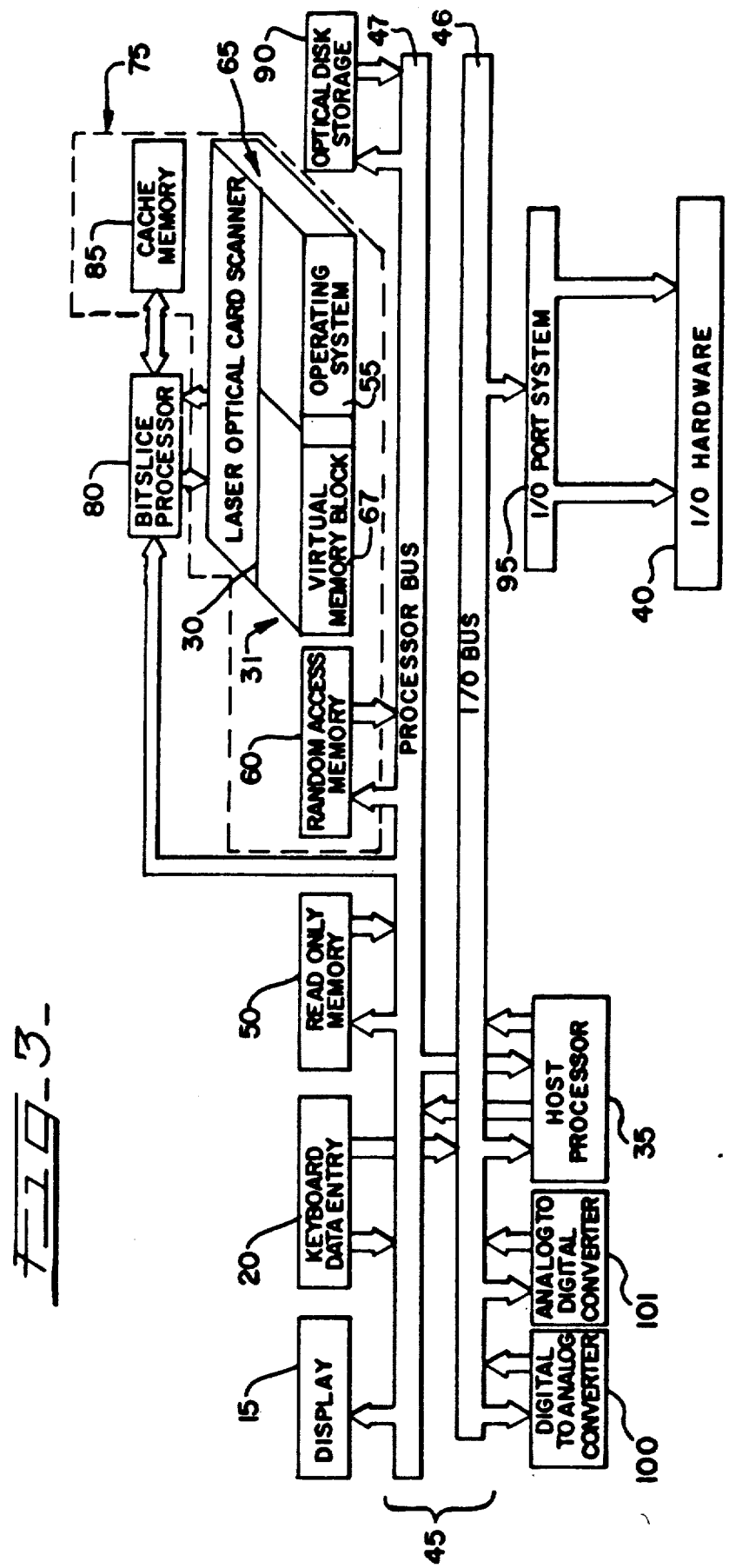

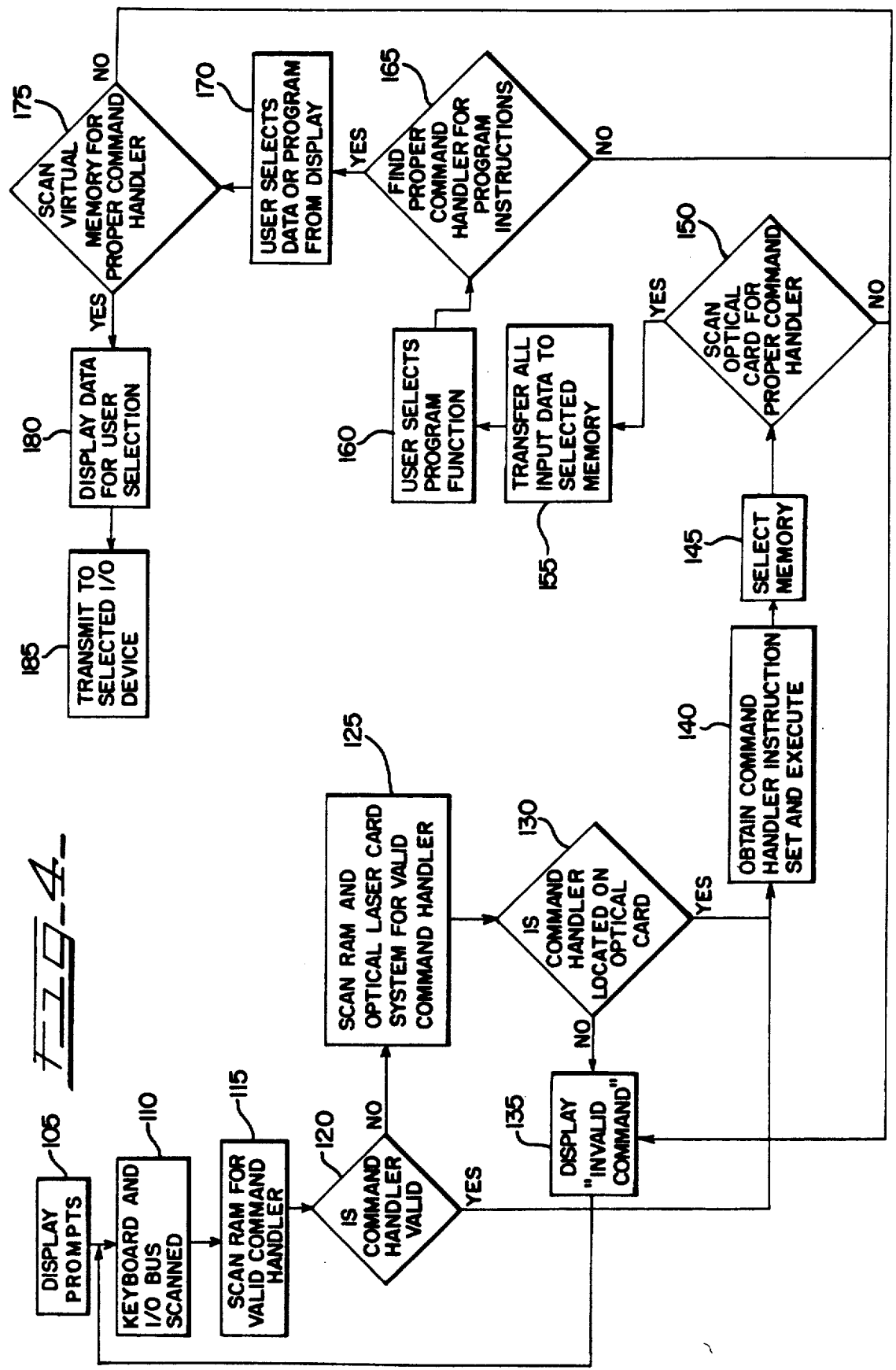

COMPUTER SYSTEM WHICH ACCESSES OPERATING SYSTEM INFORMATION AND COMMAND HANDLERS FROM OPTICAL STORAGE VIA AN AUXILIARY PROCESSOR AND CACHE MEMORY

TECHINICAL FIELD OF THE INVENTION

The present invention relates generally to computer systems, and more particularly, to such systems which use virtual storage techniques with optically scanned mediums to enhance the capacity and reduce the response time of conventional memory storage.

BACKGROUND OF THE INVENTION

Portable data carriers with microprocessor control are known in the art. One such device is disclosed in U.S. Pat. No. 4,211,914, to Drexler, issued Aug. 8, 1980. This patent discloses a secure data storage system using both magnetic and optically encoded data on a card. The reference illustrates the use of a microprocessor and read only memory to evaluate the character of the data after a data transaction and is particularly directed to error recognition in data which is to be stored. This is unlike the present invention, which utilizes an optically scanned memory to enhance the data capacity of discrete memory devices of a computer system as well as to decrease the response time of the system. The memory capacity and response time of a computer system are enhanced by the present invention by replacing or extending such discrete memory.

In addition, cards for retention or revision of data in a remote data acquisition system are also known in the art. One such data card is disclosed in U.S. Pat. No. 3,978,320 to McBride, Jr., wherein a card capable of being read by a magnetic card reader is used for displaying and updating inventory data. Unlike the present invention which utilizes an optical laser scanner, this reference discloses an electro-magnetic data accessing system which includes a card reader and card holding matrix to access data. McBride does not utilize a data storage function to replace or extend the capacity of discrete memory devices of a computer system, as does the present invention. Further, the McBride device does not decrease the response time of the computer system.

Several prior art systems for laser optical encoding of plates or strips of optical mediums have been presented in the general field of memory recording mediums. The read/write laser optical card system and related technology utilized in the present invention is well known in the art, as exemplified by U.S. Pat. Nos. 4,360,728 and 4,314,260 to Drexler, entitled Banking Card for Automatic Teller Machines and the Like, and Laser Pyrographic Reflective Recording Layer in a Carbon Containing Absorptive Matrix, respectively.

The '728 patent discloses a data card with a pair of spaced information records. One record is a strip of high resolution reflective laser recording material. The other information record is of a magnetic recording material. An external card "reader" is needed to examine data on the information records or strips and to make additions to the "read-after-write" laser strip contained on the card. The reflective laser recording material is perforated by the laser to encode data on the card or read the data from the card. This external card must be introduced into a remote data card reader/writer for verification, modification or rejection of existing data on the card. This disclosure is particularly applicable to user/card identification applications. The '260 patent discloses a Laser Pyrographic Reflective Recording Layer utilizing a rotating disk for fast random access to the information stored on the layer. Further, the '260 patent discloses the use of stacked plates for intermediate speed random access via an electro-optical scanner. The disclosure of Drexler '728 and '260 is hereby expressly incorporated by reference.

The present invention utilizes the advantages of the laser pyrographic reflective recording layer as disclosed in U.S. Pat. No. 4,314,260 to provide a very high density data medium coupled with a remote data card as disclosed in U.S. Pat. No. 4,360,728 to configure an optical laser card data storage system. The optically encoded memory system is an extension of the random access memory portion of a computer system's architecture due to its ability to rapidly write and read computer information to and from the data card. Further, the memory system of the present invention extends the capacity of the computer's discrete random access memory without changing its characteristics. An optical laser scanner coupled with virtual memory techniques and hardware, as used in the present invention, provides rapid data searching, resembling true read/write semiconductor random access memories.

Semiconductor random access memories have heretofore not been compatible with a variety of multiple processor architectures, particularly hand-held portable architectures, due to physical space requirements. Previously, serial configurations in memory systems would cause major wait states while writing to or reading from the read/write optical laser memory. This occurred when the required computer information was not available in the bit slice processor via the cache memory at the required time because the desired computer information was at the extremities of the optical strip; i.e. the farthest geographic location from the nominal position of the optical reader.

Accordingly, the present invention increases the read/write speed of a computer system by including a virtual memory configuration having a bit slice processor which is in communication with a main processor via a processor bus and an input/output bus. This type of configuration significantly accelerates the retrieval time of the sytem allowing computer information to be available for use by the main processor in a timely fashion. Utilization of an optical laser scanned medium with virtual memory techniques offers a significant improvement in the area of available "on board" active memory providing reduced physical size of the system, while decreasing the accessing time of such a system. Moreover, the use of a multiple processor architecture, in combination with this type of memory medium, brings large scale performance to moderate size geometries and price structures, previously not available in the computer market.

SUMMARY OF THE INVENTION

The present invention utilizes virtual memory storage techniques coupled with an optical laser scanned medium to enhance the capacity of discrete hardware memory storage of a computer system by replacing or extending such memory storage. The terms "discrete memory storage" are defined to mean an existing conventional hardware memory storage device of a typical computer system into which data can be entered, held and from which data can be retrieved at a later time. Computer information, which may be data or program information, is encoded optically through the use of a processor controlled laser scanner onto a physical medium. The apparatus of the present invention includes a scanner for accessing computer information and a memory device for storing computer information. This configuration provides the ability to rapidly access and transfer the computer information to and from the scanner, as well as to and from the discrete memory storage associated with a computer system. This type of configuration thereby extends the memory capacity of the computer system while reducing the access and retrieval time necessary to manipulate computer information. Further, the present invention also includes a processor in communication with the scanner and the memory storage device for rapidly and efficiently processing and controlling the computer information.

The illustrated preferred embodiment of the present invention also includes a host or main processor for processing computer information, a data entry device or keyboard for entering computer information, a display device for displaying computer information, a memory device that functions as an operating memory and as temporary storage memory, a laser encoded card for storing computer information and a laser driven or operated card reader/writer for reading and writing computer information to and from the laser encoded card. These individual elements are in communication and controlled by the main processor through inclusion of a bus system effecting connection therebetween.

In operation, the memory enhancing system extends the memory capacity of a computer system by storing the computer information on a rapidly scannable storage medium. The computer information is accessed from the scannable storage medium and transferred to the discrete memory storage of the computer system through use of the memory system of the present invention.

In the preferred embodiment of the memory enhancing system, the operative steps of the present invention are main processor controlled for expedient and efficient transfer of computer information. The computer information is retrieved from the optically scanned medium and transferred to a cache memory device by a bit slice processor device. The main processor scans an input/output bus for a user input command. The discrete memory storage device is then scanned for an operating system command corresponding to the input command. If not present in the discrete memory, the optically scanned medium is scanned for the handling instructions corresponding to the operating system command. Accordingly, the corresponding handling command is retrieved and transmitted to and from the discrete memory storage device providing rapid accessing and transfer of the computer information.

The memory enhancing device of the present invention provides a relatively large memory storage capacity compared to the relative size of the scanned medium included in the basic architecture of a computer system. This enlarged memory capacity is attainable through the use of a laser encoded optical medium in combination with virtual memory techniques. Optical media may be configured as strips, cards, or data pages, each having increasingly larger data capacity volumes. Further, the use of a laser encoded optical medium affords superior computer information integrity since such a medium is not affected by magnetic fields, or surface wear, and can retain information content in very high temperature environments.

The memory enhancing apparatus of the present invention allows the application of optical laser encoded memory to a wide variety of computational architectures and geometries. Up to the present time, use of an optical medium as a memory storage for a computer system has been religated to disk-driven geometries, or data cards which are implanted with optical medium strips. Both of these configuration types are external to the central processing unit and its associated bus configuration. By including the optical memory in the extended bus portion of the architecture and, the optical scanner in relatively close combination with the main processor chip and the memory/processor bus hardware, the physical size as such system is reduced. Such size reduction allows the computer system to be housed in a relatively small hand-held or palm-held package having increased portability.

In addition, the present invention provides a relatively large amount of versatile random access memory storage that complements the discrete memory capacities of an "on board" computer configuration. "On Board", is taken to means included within or inside the confines of the external housing of the unit containing the main processor. The invention can be utilized in hand-held, knee-top, desk-top, or main-frame configurations, thereby providing a versatile, compact, relatively inexpensive memory enhancement for a variety of computer systems.

Numerous other advantages and features of the present invention will become readily apparent from the following detailed description of the preferred embodiment of the invention, from the claims, and from the accompanying drawings in which like numerals are employed to designate like parts throughout the same.

DESCRIPTION OF THE DRAWINGS

FIG. 1 is a front perspective view of a portable hand-held computer embodying the optically encoded memory system of the present invention;

FIG. 2 is a functional block diagram illustrating the operation of the optically encoded memory system and its associated hardware.

FIG. 3 is a detailed bus diagram illustrating the operating architecture of the optically encoded memory system; and FIG. 4 is a functional flow chart illustrating the detailed functional steps carried out by the optically encoded memory system.

DETAILED DESCRIPTION OF THE PREFERRED EMBODIMENT

While this invention is susceptible of embodiment in many different forms, there is shown in the drawings and will herein be described in detail an illustrated embodiment of the invention. It should be understood, however, that the present disclosure is to be considered as an exemplification of the principles of the invention and is not intended to limit the invention to the embodiment illustrated.

Single processor, distributed processing or pipeline computer architectures are all capable of having their physical memory size reduced and data storage capacities increased by the use of virtual memory techniques with very high data density memory mediums.

The term virtual memory denotes a conventional scheme to extend the capacity of the main memory or discrete memory hardware of a computer system. One type of system for enlarging a computer memory over and above its volatile memory capacity is called disk random access memory (Disk RAM). Disk RAM is a term used to define a conventional memory component that is accessed through a bus networking system by a main processor. The Disk RAM scheme provides storage features similar to those of conventional memory disk storage, while decreasing computer information accessing time. Accordingly, the Disk RAM scheme provides memory storage which reacts like conventional discrete semiconductor random access memory, while reducing the number of components and physical size of the memory device.

It should be understood, that computer information as used herein may include a variety of information signals that may be used by a computer system. Such information signals may include, but are not limited to, program instructions and data elements.

Expansion of the main memory of a computer system by virtual memory techniques is accomplished in the present invention by interposing a disk RAM type memory between the main processor and main memory of the system in a bus configuration. Special accessing methods are implemented in the systems addressing scheme to provide rapid access of the computer information stored in the disk RAM type memory and the main memory when required. Virtual memory techniques which utilize special addressing schemes allow computer information to be easily and rapidly accessed while requiring only a minimal amount of hardware. The additional hardware needed to store and retrieve computer information by virtual memory techniques is generally the main processor and an associated bit slice processor having a cache memory.

A high data density disk RAM type memory medium includes, but is not limited to, an optical laser pyrographic layer affixed to a physical medium such as a card or the like. The optical laser medium may be in the form of a strip affixed to the surface of a wallet size card with a length equal to or exceeding its width. The optical medium may be enlarged to cover almost the entire surface of the card. However, it should be understood that the size of the optical laser medium may vary greatly from a very thin strip to a full page containing as much as one half of a gigibyte of computer information or more, so long as the data is divided into convenient data blocks.

The optical medium is scanned by a low power optical laser scanner while the medium is mechanically positioned below the reading laser in order to access the computer information stored on the medium. Computer information written to or retrieved from the laser strip, is then transferred by the bit slice processor via a processor/memory bus to the random access memory. The advantages of the memory enhancing system of the present invention, including an optical medium coupled with the features of a Disk RAM type of memory system, are the rapid read/write and scanning rates of the low power laser scanner, the ability to reduce the size of the data storage medium, and the ability to package the low power laser scanner and the Disk RAM in an enclosure having relatively small physical dimensions.

Generally, the computer information is accessed from an optically scanned medium by an optical laser scanner. A display is provided for user viewing of the operation of the system. A data entry device is provided for entering computer information comprising data and/or program instructions. A virtual memory device stores computer information which allows subsequent accessing and transferring of the computer information to and from the optical laser scanner and to and from discrete memory storage devices of the system in a rapid manner. A main processor is also provided for processing computer information by transferring data information from the data entry device, the scanner, and from system associated peripheral devices to one or more of the discrete memory storage devices through the use of a processor bus system and an input/output bus system. The virtual memory device transfers the computer information via the processor bus, from the optically scanned medium, to the discrete storage devices of the system.

Specifically, FIG. 1 illustrates a portable hand-held unit 10 embodying the optically encoded memory system of the present invention. The hand-held unit 10 includes a display 15 which allows system prompts, data, program instructions, or any other information to be communicated between the user and the system. It should be understood that display 15 may include, but is not limited to a liquid crystal display, a light emitting diode display or the like. The hand-held unit 10 also includes a data entry device, illustrated herein as a standard ASCII keyboard 20. Keyboard 20 allows user communication of computer information to the system and is located directly below the display 15 for ease of operation.

A standard telephone touch-tone type key pad 25 is located directly below the keyboard 20 and provides for the interfacing of unit 10 with a telephone system. Such a telephone interface allows unit 10 to communicate with other units and other computers if desired. Hand-held unit 10 further includes an optical laser card reader/writer 30 which is located directly below the touch-tone key pad 25 and allows computer information to be accessed from and written to an optically laser encoded card, such as card 31 illustrated in FIG. 1. It should be understood that, while the hand-held unit 10 is illustrated herein, the computer system embodying the optically encoded memory system of the present invention can take on a variety of physical configurations. Such physical configurations may include, but are not limited to, small hand-held units, intermediate sized portable and fixed computer systems and large, stationary, multiple user main frame computer systems.

Referring now to FIG. 2, the enhanced memory scheme carried out by the optically encoded memory system of the present invention is illustrated with its associated hardware in functional block diagram form. The system includes the display 15, the keyboard 20, a main processor 35, a group of input/output (I/O) devices 40, a plurality of busses 45, a read only memory 50, an operating system 55, a random access memory 60, a virtual memory 65, and a cache memory 70.

Upon application of power, a computer system embodying the present invention initially performs a "cold boot" or to attain a system-ready mode where the system parameters are initialized and the system is readied for entry and/or retrieval of computer information. During the system-ready mode, the user, in response to a system ready prompt on display 15, inputs a command via keyboard 20 which activates the main processor 35. Upon activation of main processor 35, the processor polls all the input/output devices 40 via I/O memory bus 45 for functions waiting to be performed by the system. The system configuration and "cold boot" is program defined in the read only memory 50. The main processor 35, via display 15, will then indicate a message of whether or not there is an error. If main processor 35 finds an error, the processor will shut down and indicate through display 15, that an error was found. If no error is present, the main processor 35 causes display 15 to indicate the message "insert the card". At this point, the operator can insert the optically encoded card 31 into laser optical card reader 30.

If optical card 31 is inserted and read by the laser optical card reader 30, main processor 35 examines the information read from the optical card for errors. If an error is found, main processor 35 indicates an "invalid card" message on display 15. If no error is found, and the optical card is valid, main processor 35 transfers the message "operating system loading" to display 15. The operating system information contained on optical card 31 is then transferred by main processor 35 to the random access memory 60. Main processor 35 is now operating under the control of the operating system 55 and will then poll all option peripherals on busses 45 to check if any functions have changed, since the initial check. If changes have occurred, the changed functions are completed. Main processor 35 will then open the communications links to all option peripherals previously located and transfer a message to display 15 indicating that the system is loaded. At this point, all of the required operational computer information is stored in the memory of the computer system. Accordingly, optical card 31 could be removed by the user and the system would remain operational.

FIG. 3 illustrates the processor 35 and input/output operating system of the computer system' architecture embodying the present optically encoded memory system, in hardware block diagram form. As can be seen and as been described previously herein, the system includes a virtual memory, utilizing an "on board" optical laser card memory system. Further, it can be seen that buses 45 include an I/O bus 46 and a processor bus 47. The processor bus 47 conventionally includes the highest speed and priority control, address, and data buses for the host processor 35 while the I/O bus includes control, address and data lines which are accessed through ports or address decoding schemes. Commonly, devices connected to the I/O bus are serviced on an interrupt basis. I/O bus 46 interconnects keyboard 20 and main processor 35 with an I/O Port System 95 and associated I/O hardware 40, a digital to analog converter 100 and an analog to digital converter 101. Processor bus 47 interconnects display 15, keyboard 20 and main processor 35 with read only memory 50, random access memory 60 and an optical disk storage 90. Read/write memory 75 contains laser optical card scanner 30, operating system 55 and virtual or simulated block memory 65. Optical laser card scanner or medium 30 and "virtual" or "simulated" block memory 65 and are depicted in FIG. 3 as one and the same and with operating system 55, each reside within read/write memory 75. It is this unique combination, under the control of main processor 35 through input/output 46 and processor bus 47, that allows rapid access, transfer and retreival of computer information.

After the optically encoded memory system of the present invention completes the "cold boot" mode and attains the system-ready mode as previously described herein, the system is available to perform a variety of data manipulations in carrying out the method of the present invention. These manipulations are performed through the system illustrated in FIG. 3, and in particularly, under the control of main processor 35 through read/write memory 75. FIG. 4 illustrates the functional steps and method of operation, in flow chart form, taking place during operation of the computer system of FIG. 3.

Referring now to both FIGS. 3 and 4, initially the display 15 indicates a user prompt for the user to select a particular operation or function step, 105. The main processor 35 examines keyboard 20, I/O bus 46 and processor bus 47 for user selected activities, step 110. The user will then input via the keyboard 20 the command of either yes or no for the particular operation desired. It should be noted that until the user enters a command through keyboard 20, the system repeatedly scans the keyboard and system peripherals for activity. If the user command is yes, the processor 35 scans an operating system command table in random access memory 60 for a valid command handler, step 115. A system command handler, as used herein may be any type of function as required by the systems configuration. Such functions include, but are not limited to, Enter Date/Time, Display Disk Data, Request System Hibernation Mode, Request System Shutdown, and the like.

Main processor 35 then checks to see if the operating system' command handler selected is valid, step 120. If valid, the processor 35 will first scan the random access memory and 60, then optical card 31 (through the optical laser card scanner 30, bit slice processor 80 and cache memory 85) for the proper command handler, step 125. Main processor 35 then checks to see if the command handler selected is found on optical card 31, step 130, through the optical laser card scanner 30. If the command handler is not found on optical card 31, main processor 35 transfers the message "invalid command" to display 15 at step 135, and returns to step 110 where the keyboard 20, I/O bus 46 and processor bus 47 are again scanned. If the requested command handler is found on the optical card, processor 35 retreives the command handler instruction set from the cache memory 85, via bit slice processor 80, and the optical laser card scanner 30. The system is now ready to execute the instruction set of the command handler, step 140.

The main processor 35 executes the command handler for the input mode, for example, the "Enter Data, Date/Time" mode. Main processor 35 then selects which memory is to be used to store the user selected calculations and data manipulations: the optical card memory 75 via the bit slice processor 80, cache memory 85, optical laser card scanner 30 optical card 31; or the random access memory 60, step 145. Processor 35 then scans optical card 31 via optical laser card scanner 30, bit slice processor 80, cache memory 85 and virtual block memory 65 for the proper command handler in use, step 150. If the command handler found is invalid, the system's processor 35 causes the display 15 to indicate "invalid command" at step 135 and returns to step 110, where the keyboard 20, I/O bus 46 and processor bus 47 are again scanned. If the proper command handler is found, the processor 35 transfers all the entered computer information from the keyboard 20 into the desired memory device such as the random access memory 60, the optical card memory 75 or the optical disk memory 90, step 155. If random access memory 60 or optical card memory 75 is chosen, the user may then manipulate the data in the random access memory 60 and may further place the data into permanent storage, such as on an optical disk 90, by selecting the "enter data" command and choosing the appropriate memory device.

If the user desires to manipulate or store the data permanently the "call directory" or "directory of programs" function is selected at step 160. During this portion of the optically encoded memory system's operation, processor 35 scans optical card 31 via optical card scanner 30 the bit slice processor 80, cache memory 85 and virtual block memory 65 for the proper command handler for program instructions, step 165. If the command handler program instruction found is not correct, the processor 35 will cause the display 15 to indicate "invalid command", step 135. If the command handler found is proper, the processor transfers the "directory of data" or data block information from the optical card 31 via optical laser card scanner 30, cache memory 85, and bit slice processor 80 to the display 15. The user may then select from the "directory of data or programs" on the display 15 and instruct the processor 35 via the keyboard 20 to place the selected data into the random access memory 60 for further user manipulation or storage, step 170. For example, if the user selects the Enter Date/Time command handler, the user enters the date and time via the keyboard 20. Under control for main processor 35, through I/O bus 46, processor bus 47, bit slice processor 80, cache memory 85 and optical laser card scanner 30, the entered date and time will then be encoded or written onto optical card 31.

After the user selects the data or program from display 15, main processor 35 causes the virtual memory 65 via the bit slice processor 80 to be scanned for the proper command handler, step 175. If the command handler found is incorrect, processor 35 causes display 15 to indicate "invalid command" at step 135 and returns to functional step 110 where keyboard 20, I/O bus 46 and processor bus 47 are again scanned. If the proper command handler found is correct, processor 35 then causes the data portion of virtual memory 65, optical disk storage 90 and/or other associated memory storage devices to be scanned for the required data. Main processor 35 then transfers the data to display 15 for the user's selection, step 180. The user then selects the I/O device 40 desired via the I/O Port system 95. Processor 35 scans the user's input commands via keyboard 20, I/O bus 46 and processor 47, and configures the system to receive or transmit the data using digital to analog converter 100 or analog to digital convertor 101, as required by the particular I/O device 40 selected, step 185.

If the user selects the "systems hibernation mode", processor 35 will then reduce power consumption for the entire system by scanning I/O bus 46 only, until the user inputs a command via keyboard 20 or selects to shut down the system.

Accordingly, the unique optically encoded memory system of the present invention provides the ability to couple a very high density data medium with a variety of multiple processor computer architectures to negate any disparity in data search time and thereby allow relatively rapid access, retrieval transfer and storage of computer information. In addition, the combination of a very high density data medium with a laser optical scanner in an extremely compact and portable package provides large scale computer performance in small to moderate sized computer architectures. In addition, this large scale performance is provided by the optically encoded memory system of the present invention in a cost efficient manner. Further, the optically encoded memory system is substantially universally adaptable to currently available computer architectures.

From the foregoing, it will be appreciated that numerous variations and modifications may be effected without departing from the spirit and scope of the novel concepts of the subject invention as defined hereinafter in the appended claims. It is to be understood that no limitation with respect to the specific apparatus illustrated herein is intended or should be inferred.

What is claimed is:

1. A computer system comprising:
   host processing means for processing instructions and data;
   first memory means for storing instructions and data;
   a processor bus connecting said host processing means and said first memory means;
   auxiliary processing means connected to said processor bus, cache memory means, and optical storage means, and controlled by said host processing means for retrieving information stored in said optical storage means and for storing said retrieved information in said cache memory means;
   said host processing means accessing the information stored in said cache memory means via said processor bus, storing the accessed information in the first memory means, and controlling operation of said computer system based upon the accessed information stored in said first memory means;
   said optical storage means having scanning means and a write once, read many times optical storage medium for storing operating system information which controls normal operation of said computer system, and for storing command handler information comprising a plurality of command handlers which control said computer system in response to a user entered command; and
   said host processing means controlling said auxiliary processing means to retrieve said operating system information from said optical storage means to control normal operation of said computer system upon initialization of said computer system, and further controlling said auxiliary processing means to retrieve said command handler information from said optical storage means to control the operation of said computer system in response to the user entered command.

2. The computer system as set forth in claim 1 wherein said host processing means further includes:
   an input/output bus connected to at least one peripheral device through which the user command can be communicated to said host processing means.

3. The computer system as set forth in claim 1 wherein said host processing means further includes:
   a read only memory connected to said host processing means by said processor bus for storing boot program information, a supervisory portion of said operating system information, and system configuration information.

4. A computer system as set forth in claim 1 wherein:
   said scanning means comprises laser optical scanning means for retrieving said information from said optical storage medium.

5. A computer system as set forth in claim 4 wherein said optical storage medium comprises:
   an optical storage medium in the shape of a card, wherein said scanning means and said card are moveable relative to one another.

6. A computer system as set forth in claim 1 wherein:
   said first memory means, said cache memory means, and said optical storage means are operated in conjunction with one another as a virtual memory under control of said host processing means.

* * * * *